United States Patent
Gagliardo et al.

(10) Patent No.: US 10,186,723 B2
(45) Date of Patent: Jan. 22, 2019

(54) METHOD TO ACTIVELY CONTROL CELL PRESSURE DROP DURING OPERATION

(71) Applicant: GM GLOBAL TECHNOLOGY OPERATIONS LLC, Detroit, MI (US)

(72) Inventors: Jeffrey J. Gagliardo, Clarkston, MI (US); Jeremy W. Dabel, Lake Orion, MI (US); Balasubramanian Lakshmanan, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 52 days.

(21) Appl. No.: 15/463,861

(22) Filed: Mar. 20, 2017

(65) Prior Publication Data
US 2018/0269505 A1    Sep. 20, 2018

(51) Int. Cl.
*H01M 8/04* (2016.01)
*H01M 8/04746* (2016.01)

(52) U.S. Cl.
CPC .............................. *H01M 8/04753* (2013.01)

(58) Field of Classification Search
CPC ...... H01M 8/04753; H01M 8/00; H01M 8/02; H01M 8/0202; H01M 8/0215; H01M 8/0221; H01M 8/0223; H01M 8/023; H01M 8/0232; H01M 8/0247; H01M 8/025; H01M 8/0252; H01M 8/0254; H01M 8/0258; H01M 8/026; H01M 8/0265
See application file for complete search history.

(56) References Cited

U.S. PATENT DOCUMENTS

| | | | |
|---|---|---|---|
| 6,093,502 A * | 7/2000 | Carlstrom, Jr. ... | H01M 8/04156 429/413 |
| 7,972,741 B2 | 7/2011 | Goebel et al. | |
| 2014/0072899 A1 | 3/2014 | Fly et al. | |

* cited by examiner

*Primary Examiner* — Anthony R. Jimenez
(74) *Attorney, Agent, or Firm* — Cantor Colburn LLP

(57) ABSTRACT

A method for controlling a pressure drop across the anode side or the cathode side of a fuel cell stack by controlling the intrusion of a cell separator into the flow channels in a feeder region of the stack so as to create a larger pressure volume on a pressure bias side of the stack. The method controls the flow rates of one or both of the cathode and anode reactant gases so as to cause the cell separators in an inlet feeder region and/or an outlet feeder region to move relative to the anode side and the cathode side so as to change a flow volume in the inlet feeder region and/or the outlet feeder region to control the pressure drop.

10 Claims, 3 Drawing Sheets

METHOD TO ACTIVELY CONTROL CELL PRESSURE DROP DURING OPERATION

BACKGROUND OF THE INVENTION

Field of the Invention

This invention relates generally to a system and method for controlling a pressure drop across a cathode side or an anode side of fuel cells in a fuel cell stack and, more particularly, to a system and method for actively controlling a pressure drop across a cathode side or an anode side of fuel cells in a fuel cell stack that includes controlling a reactant gas state in the cathode or the anode flow channels for one of the cathode side or the anode side to move a cell separator in a feeder region into or out of the cathode or the anode flow channels in the opposing cathode side or anode side.

Discussion of the Related Art

A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The electrons from the anode cannot pass through the electrolyte, and thus are directed through a load to perform work before being sent to the cathode. Proton exchange membrane fuel cells (PEMFC) are a popular fuel cell type for vehicles, and generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer, where the catalytic mixture is deposited on opposing sides of the membrane. The combination of the anode catalytic mixture, the cathode catalytic mixture and the membrane define a membrane electrode assembly (MEA). The membranes block the transport of gases between the anode side and the cathode side of the fuel cell stack while allowing the transport of protons to complete the anodic and cathodic reactions on their respective electrodes.

Several fuel cells are typically combined in a fuel cell stack to generate the desired power. A fuel cell stack typically includes a series of flow field or bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Various techniques are known in the art for fabricating the bipolar plates. In one design, the bipolar plates are made of a composite material, such as graphite, where two plate halves are separately molded and then glued together so that anode flow channels are provided at one side of one of the plate halves, cathode flow channels are provided at an opposite side of the other plate half and cooling fluid flow channels are provided between the plate halves. In another design, two separate plate halves are stamped and then welded together so that anode flow channels are provided at one side of one of the plate halves, cathode flow channels are provided at an opposite side of the other plate half and cooling fluid flow channels are provided between the plate halves.

The fuel cell stack includes an active region in which the cell membranes are located, which is the area in the stack where the electro-chemical reaction occurs. The reactant gases are fed to the channels in the active region from an inlet header or headers through a non-active feeder region that includes part of the plates, but does not include a membrane, which is expensive, where a typical fuel cell stack design will employ a sub-gasket between the cathode and anode flow channels in the feeder region.

Some fuel cell stack operations benefit from the anode side having a relatively low pressure drop, such as for anode exhaust gas recirculation purposes, and some fuel cell stack operations benefit from the anode side having a relatively high pressure drop, such as for removing liquid water in the reactant gas flow channels. Some fuel cell operations also benefit from the cathode side having a relatively low pressure drop, such as for reducing the compressor power required to deliver the required air flow to the reactant gas flow channels. Currently, a fuel cell stack is typically designed to provide a compromise pressure drop that best satisfies all stack operating conditions. However, this pressure drop is not optimal for all stack operating conditions. Significant design and assembly processes of the bipolar plates in the fuel cell stack is necessary to provide a flow rate of the reactant gases for both the cathode and anode side of the fuel cell stack that is substantially the same across the entire length of the stack. In order to accomplish this, it is typically necessary to provide a special configuration of the angle of the flow channels, the size of the flow channels, etc. in the stack feeder region.

SUMMARY OF THE INVENTION

The present invention discloses and describes a method for controlling a pressure drop across the anode side or the cathode side of a fuel cell stack by controlling the intrusion of a cell separator, such as a sub-gasket or other insulation material, into the flow channels in a feeder region of the stack so as to create an increased flow resistance on the low pressure bias side of the stack. The method controls the fluid state of one or both of the cathode and anode reactant gases so as to cause the cell separators in an inlet feeder region and/or an outlet feeder region to move relative to the anode side and the cathode side so as to change a flow resistance in the inlet feeder region and/or the outlet feeder region to control the pressure drop.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for controlling cell pressure drop in a fuel cell stack by controlling the position of a cell separator in a feeder region is merely exemplary in nature, and is in no way intended to limit the invention or its applications or uses.

Figure 1:
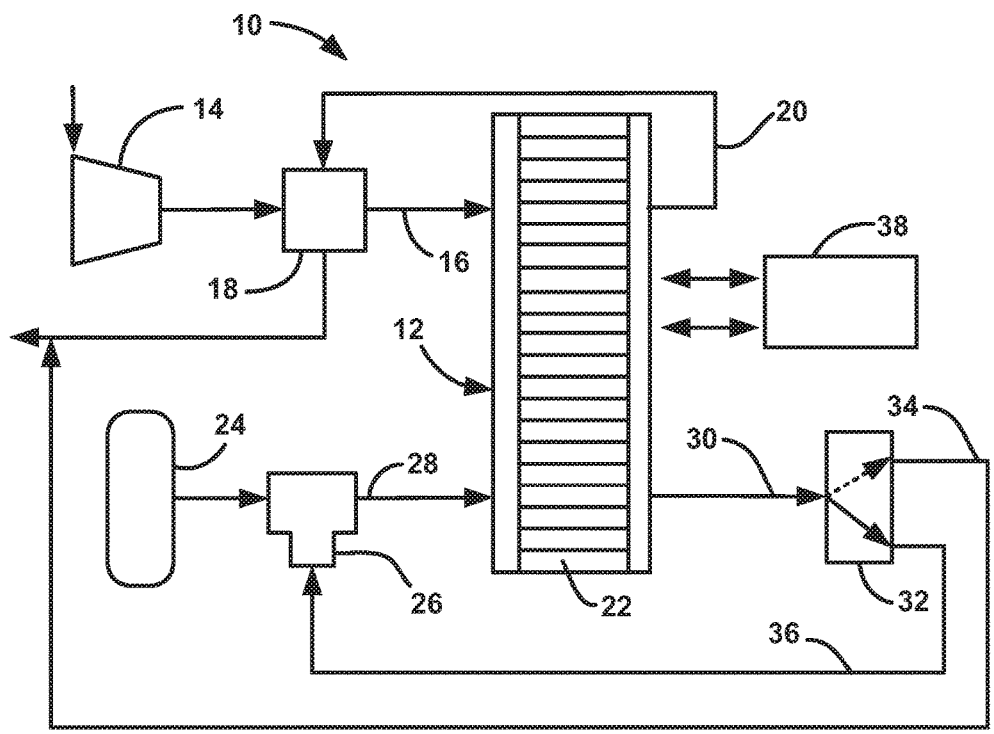
FIG. 1 is a simplified schematic block diagram of a fuel cell system.

FIG. 1 is a schematic block diagram of a fuel cell system 10 including a fuel cell stack 12 having fuel cells 22 in an active region of the stack 12. A compressor 14 provides an airflow to the cathode side of the fuel cell stack 12 on a cathode input line 16 through a water vapor transfer (WVT) unit 18 that humidifies the cathode input air. A cathode exhaust gas is output from the stack 12 on a cathode exhaust gas line 20 that directs the cathode exhaust gas to the WVT unit 18 to provide the water vapor to humidify the cathode input air. The fuel cell system 10 also includes a source 24 of hydrogen fuel, typically a high pressure tank, that provides hydrogen gas to an injector 26 that injects a controlled amount of the hydrogen gas to the anode side of the fuel cell stack 12 on an anode input line 28. Although not specifically shown, one skilled in the art would understand that various pressure regulators, control valves, shut-off valves, etc. would be provided to supply the high pressure hydrogen gas from the source 24 at a pressure suitable for the injector 26.

An anode effluent output gas is output from the anode side of the fuel cell stack 12 on an anode output line 30, which is provided to a bleed valve 32. Nitrogen cross-over from the cathode side of the fuel cell stack 12 dilutes the hydrogen gas in the anode side of the stack 12, thereby affecting fuel cell stack performance. Therefore, it is necessary to periodically bleed the anode effluent gas from the anode sub-system to reduce the amount of nitrogen in the anode sub-system. When the system 10 is operating in a normal non-bleed mode, the bleed valve 32 is in a position where the anode effluent gas is provided to a recirculation line 36 that recirculates the anode gas to the injector 26 to operate it as an ejector and provide recirculated hydrogen gas back to the anode input of the stack 12. When a bleed is commanded to reduce the nitrogen in the anode side of the stack 12, the bleed valve 32 is positioned to direct the anode effluent gas to a by-pass line 34 that combines the anode effluent gas with the cathode exhaust gas on the line 20, where the hydrogen gas is diluted to a level suitable for the environment. The system 10 includes a controller 38 that controls the operation of the system 10, such as the speed of the compressor 14, the injection rate of the injector 26, etc.

Figure 2:
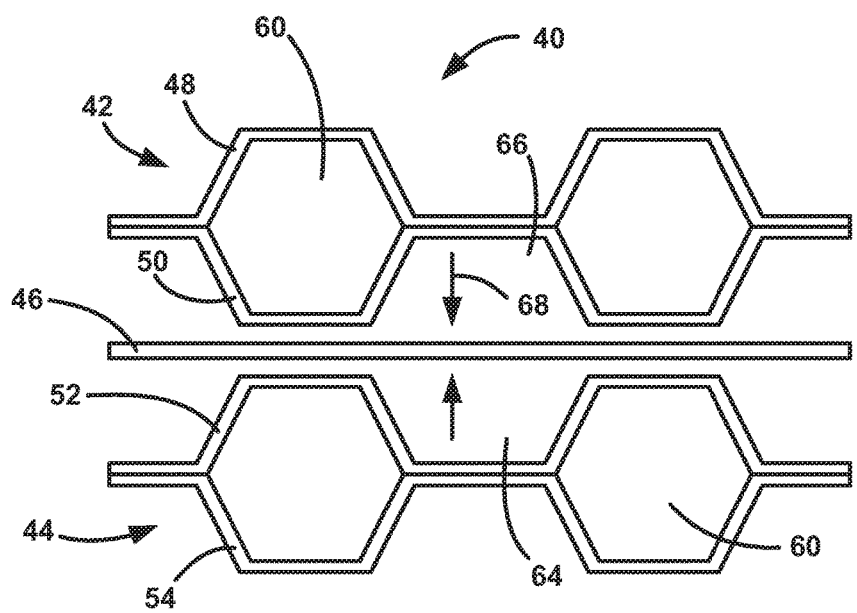
FIG. 2 is a cut-away cross-sectional view of a feeder region in a fuel cell stack where there is equal pressure on the cathode and anode sides in the feeder region.

FIG. 2 is a cut-away cross-sectional view of an inactive feeder region in a fuel cell stack 40. The fuel cell stack 40 includes two bipolar plates 42 and 44 having a unitized electrode assembly (UEA) sub-gasket 46, or other suitable cell separator, positioned therebetween. The sub-gasket 46 is a separation layer between anode reactant gas flow channels 64 and cathode reactant gas flow channels 66 in this region and could be any suitable material, such as Kapton or some other plastic. The bipolar plate 42 includes a cathode plate half 50 and an anode plate half 48. Likewise, the bipolar plate 44 includes a cathode plate half 54 and an anode plate half 52. In this design, each of the plate halves 48, 50, 52 and 54 are stamped metal plates. When the plate halves 48, 50, 52 and 54 are coupled together to provide the particular bipolar plate they define cooling fluid flow channels 60 between the plate halves 48 and 50 and the plate halves 52 and 54, the anode reactant gas flow channels 64, and the cathode reactant gas flow channels 66. It is apparent that the fuel cell stack 40 would be repetitive for some distance left and right and up and down to define the many reactant gas flow channels 64 and 66 and the cooling fluid flow channels 60 in the complete fuel cell stack 40.

The present invention proposes controlling the pressure drop across one or both of the cathode side or the anode side of the fuel cell stack 40 by using pressure bias control provided by the reactant gas flow through the flow channels 64 and 66 in one side to push the sub-gasket 46 into the flow channels 64 and 66 and tunnels on the other side so as to alter the flow volume of headers, channels and feeder regions. A higher pressure in the anode side of the fuel cell stack 40 than the cathode side creates an anode bias, and a higher pressure in the cathode side of the fuel cell stack 40 than the anode side creates a cathode bias.

This concept is illustrated in FIG. 2 where arrows 68 show pressure being applied to the sub-gasket 46 in both the anode flow channel 64 and the cathode flow channel 66. Increasing the net flow rate of the air into the cathode flow channel 66 to increase the pressure therein and/or decreasing the net flow rate of the hydrogen gas into the anode flow channel 64 to decrease the pressure therein will cause the sub-gasket 46 to flex as a result of the difference of the cathode pressure bias in the flow channels 64 and 66 so that the volume of the anode flow channel 64 is decreased and the volume of the cathode flow channel 66 is increased, thus reducing the pressure drop across the cathode side of the stack 40 and increasing the pressure drop across the anode side of the stack 40. Likewise, increasing the net flow rate of the hydrogen gas into the anode flow channel 64 to increase the pressure therein and/or decreasing the net flow rate of the air into the cathode flow channel 66 to decrease the pressure therein, will cause the sub-gasket 46 to flex as a result of the difference of pressure in the flow channels 64 and 66 so that the volume of the cathode flow channel 66 is decreased and the volume of the anode flow channel 64 is increased, thus reducing the pressure drop across the anode side of the stack 40 and increasing the pressure drop across the cathode side of the stack 40. More particularly, the higher pressure provided by a higher reactant flow rate on the anode or cathode flow bias side pushes the sub-gasket 46 away from feed region tunnels so as to create a larger volume, and allows the gas to bypass the tunnels. In other words, by constricting the flow in the other side of the flow regions in the fuel cell stack 40, the volume available for the reactive gas to flow on the bias side is larger, thus allowing greater flow volumes. The amount of pressure control able to be provided would depend on the thickness, material, etc. of the sub-gasket 46 in the feeder region.

Figure 3:
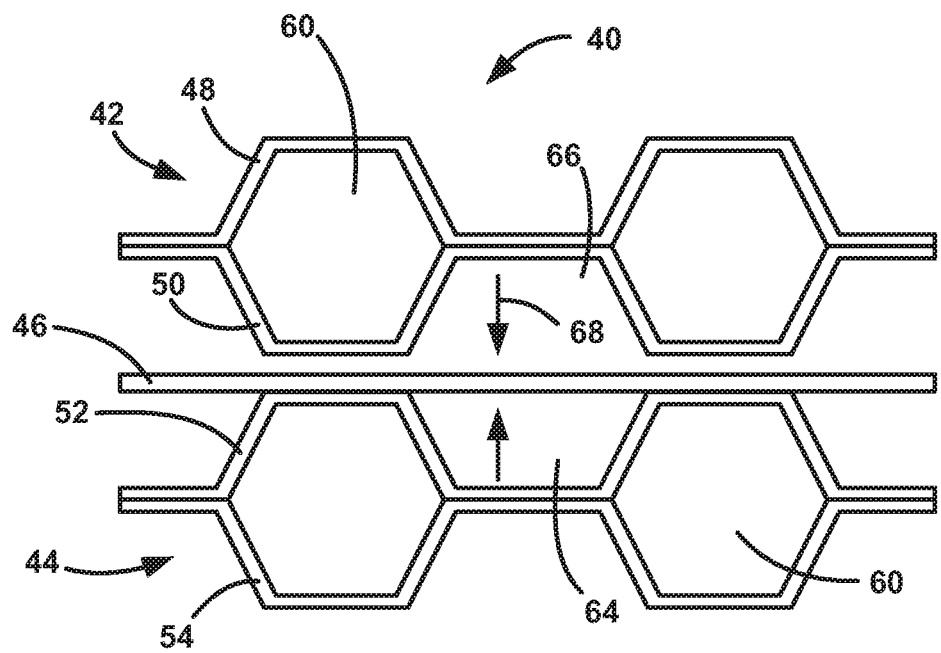
FIG. 3 is a cut-away cross-sectional view of the fuel cell stack shown in FIG. 2 where there is a slight pressure bias on the cathode side in the feeder region.
Figure 4:
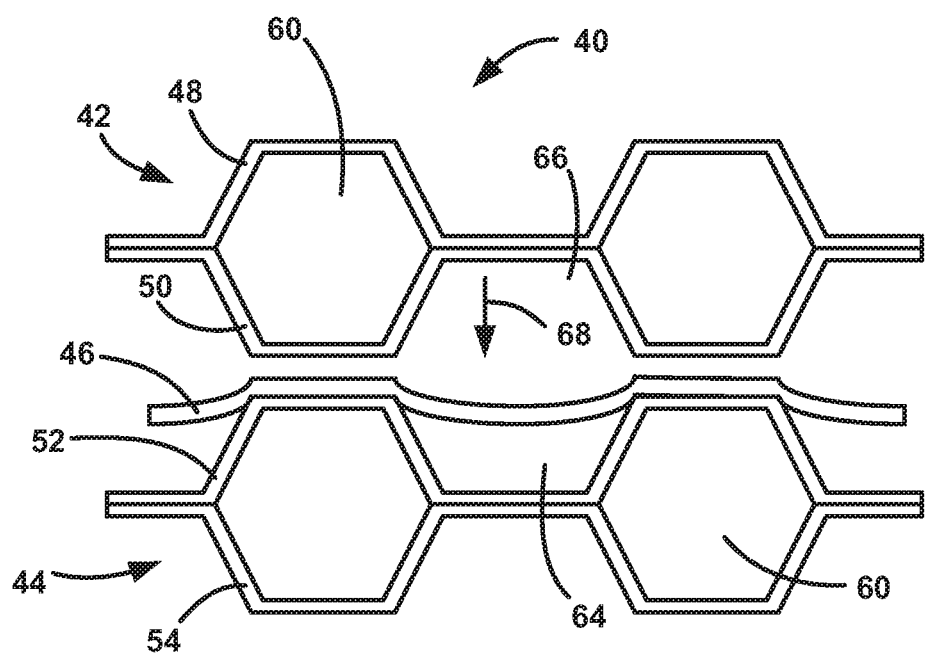
FIG. 4 is a cut-away cross-sectional view of the fuel cell stack shown in FIG. 2 where there is a large pressure bias on the cathode side in the feeder region.

Based on the foregoing, FIG. 2 shows the situation where there is equal pressure on the cathode and anode sides in the feeder region, i.e., the sub-gasket 46 is not touching the flow field on either side of the sub-gasket 46. FIG. 3 shows the situation where there is a slight cathode pressure bias in the feeder region, i.e., the sub-gasket 46 is touching the anode flow field, where the anode pressure drop is slightly increased and the cathode pressure drop is slightly decreased. FIG. 4 shows the situation where there is a large cathode pressure bias in the feeder region, i.e., the sub-gasket 46 is touching the anode flow field and is deformed, where the anode pressure drop is much higher and the cathode pressure drop is further decreased.

In this manner, the present invention reduces channel design complexity and allows for on-line pressure drop manipulation in the stack 40 to cater to system level operation conditions and system states. Further, when the sub-gasket 46 is pushed against the anode non-reactive regions, the anode reactant gas is forced into the channels creating a higher plate pressure drop and thereby providing more water removal potential.

Figure 5:
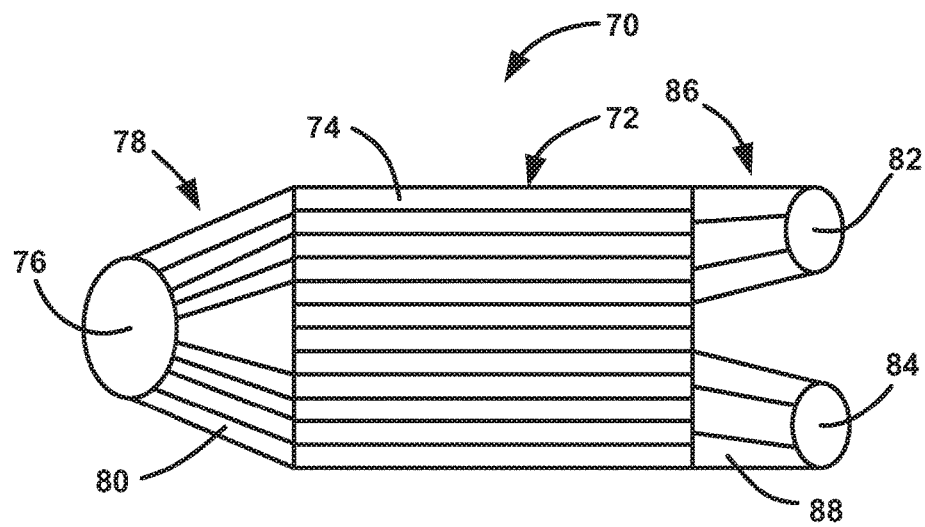
FIG. 5 is an illustration of a fuel cell stack showing flow reactant gas channels through an active region and a feeder region in the stack without separator cell pressure control.

FIG. 5 is an illustration of a fuel cell stack 70 including an active region 72 having flow channels 74 therethrough, where the active region 72 is the part of the stack 70 where the electro-chemical reaction occurs. The fuel cell stack 70 also includes an inlet header 76 and an inlet feeder region 78 between the inlet header 76 and the active region 72, where the feeder region 78 includes flow channels 80. The stack 70 also includes two outlet headers 82 and 84 and an outlet feeder region 86 including outlet flow channels 88 between the active region 72 and the outlet headers 82 and 84. It is noted that although a single inlet header 86 and two outlet headers 82 and 84 are shown, this is by way of a non-limiting example in that the number of headers in the inlet and outlet of the stack 70 can vary depending on stack design. It is further noted that the headers 76, 82 and 84, the flow channels 74, 80 and 88, and the feeder regions 78 and 86 are intended to represent one or the other of the cathode side or the anode side of the fuel cell stack 70. The configuration of the channels 80 in the inlet feeder region 78 and the configuration of the channels 88 in the outlet feeder region 86 for a typical fuel cell stack design create a high pressure drop between the inlet header 76 and the outlet headers 82 and 84.

Figure 6:
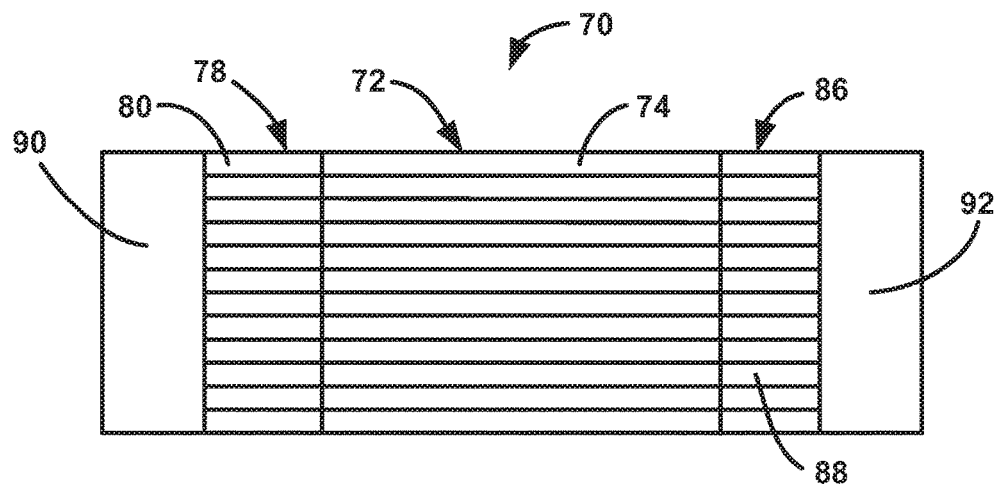
FIG. 6 is an illustration of the fuel cell stack shown in FIG. 3 with separator cell pressure control.

FIG. 6 is an illustration of the fuel cell stack 70 showing that by controlling the flow rate in the channels 80 and 88, the pressure drop across the anode side or the cathode side of the stack 70 can be decreased for a particular stack operating condition. Particularly, by increasing the reactant gas flow rate of the anode side or the cathode side of the stack 70 to increase the volume of the flow fields in the inlet feeder region 78 and the outlet feeder region 86, the inlet header 76 can be represented as a larger volume 90 such that the flow channels 80 do not constrict the flow of the reactant gas between the inlet header 76 and the active region 72. Likewise, the volume of the outlet headers 82 and 84 are represented by volume 92 showing that the flow channels 88 do not constrict the flow of the reactant gas through the outlet feeder region 86. Reactant gases from the headers 76, 82 and 84 may enter the active region 72 through the flow channels 80 or may bypass the flow channels 80 through volumes created using sub-gasket stiffness, pressure bias and gap size between repeating plates.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling a pressure drop across a cathode side or an anode side of a fuel cell stack, said stack including an active region, an inlet feeder region and an outlet feeder region, said stack further including a series of stacked bipolar plates and a cell separator between the bipolar plates in the feeder regions, where the stack includes cathode flow channels and anode flow channels from the inlet feeder region through the active region to the outlet feeder region, said method comprising:
   providing a cathode reactant gas flow through the cathode flow channels from the inlet feeder region to the active region at a certain flow rate;
   providing an anode reactant gas flow through the anode flow channels from the feeder region to the active region at a certain flow rate; and
   controlling the flow rates of one or both of the cathode and anode reactant gases so as to cause the cell separators in the inlet feeder region and/or the outlet feeder region to move relative to the anode side and the cathode side so as to change a flow volume in the inlet feeder region and/or the outlet feeder region to control the pressure drop; wherein controlling the flow rates of one or both of the cathode and anode reactant gases includes controlling the flow rates so that the reactant gas can bypass feed channels in the inlet feeder region or the outlet feeder region through volumes created by the movement of the cell separators.

2. The method according to claim 1 wherein controlling the flow rates of one or both of the cathode and anode reactant gases includes increasing the flow rate of the cathode reactant gas so as to increase the flow volume in the cathode side of the inlet feeder region and/or the outlet feeder region to reduce the pressure drop across the cathode side of the fuel cell stack.

3. The method according to claim 1 wherein controlling the flow rates of one or both of the cathode and anode reactant gases includes increasing the flow rate of the anode reactant gas so as to increase the flow volume in the anode side of the inlet feeder region and/or the outlet feeder region to increase the pressure drop across the cathode side of the fuel cell stack.

4. The method according to claim 1 wherein controlling the flow rates of one or both of the cathode and anode reactant gases includes increasing the flow rate of the anode reactant gas so as to increase the flow volume in the anode side of the inlet feeder region and/or the outlet feeder region to reduce the pressure drop across the anode side of the fuel cell stack.

5. The method according to claim 1 wherein controlling the flow rates of one or both of the cathode and anode reactant gases includes increasing the flow rate of the cathode reactant gas so as to increase the flow volume in the cathode side of the inlet feeder region and/or the outlet feeder region to increase the pressure drop across the anode side of the fuel cell stack.

6. The method according to claim 1 wherein the cell separators are sub-gaskets.

7. A method for controlling a pressure drop across a cathode side of a fuel cell stack, said stack including a series of stacked bipolar plates, said method comprising:
   providing a cathode reactant gas flow through cathode flow channels from an inlet feeder region to an active region at a certain flow rate; and
   controlling the flow rate of the cathode reactant gas so as to cause a cell separator between the bipolar plates in the inlet feeder region to move so as to increase a cathode flow volume in the inlet feeder region to control the pressure drop; wherein controlling the flow rate of the cathode reactant gas includes controlling the flow rate so that the reactant gas can bypass feed channels in the inlet feeder region through volumes created by the movement of the cell separator.

8. The method according to claim 7 wherein the cell separator is a sub-gasket.

9. A method for controlling a pressure drop across an anode side of a fuel cell stack, said stack including a series of stacked bipolar plates, said method comprising:
   providing an anode reactant gas flow through anode flow channels from an inlet feeder region to an active region at a certain flow rate; and
   controlling the flow rate of the anode reactant gas so as to cause a cell separator between the bipolar plates in the inlet feeder region to move so as to increase an anode flow volume in the inlet feeder region to control the pressure drop; wherein controlling the flow rate of the cathode reactant gas includes controlling the flow rate so that the reactant gas can bypass feed channels in the inlet feeder region through volumes created by the movement of the cell separator.

10. The method according to claim 9 wherein the cell separator is a sub-gasket.

\* \* \* \* \*